(12) United States Patent
Hewinson

(10) Patent No.: US 8,478,195 B1
(45) Date of Patent: Jul. 2, 2013

(54) TWO-FACTOR USER AUTHENTICATION USING NEAR FIELD COMMUNICATION

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/399,622

(22) Filed: Feb. 17, 2012

(51) Int. Cl.
*H04B 5/00* (2006.01)

(52) U.S. Cl.
USPC ......... 455/41.1; 455/41.2; 455/410; 455/558; 340/572.1; 235/379

(58) Field of Classification Search
USPC .... 455/41.1, 41.2, 410, 558, 3.06; 340/572.1, 340/10.3; 235/379
See application file for complete search history.

(56) References Cited

U.S. PATENT DOCUMENTS

| | | | | |
|---|---|---|---|---|
| 5,963,136 A * | 10/1999 | O'Brien | | 340/573.1 |
| 6,150,942 A * | 11/2000 | O'Brien | | 340/573.1 |
| 7,059,531 B2 * | 6/2006 | Beenau et al. | | 235/487 |
| 7,382,225 B2 * | 6/2008 | Kung et al. | | 340/5.61 |
| 7,446,644 B2 * | 11/2008 | Schaffzin et al. | | 340/5.6 |
| 7,482,929 B2 * | 1/2009 | Bowers et al. | | 340/572.1 |
| 7,492,258 B1 * | 2/2009 | Shoarinejad et al. | | 340/572.1 |
| 7,538,678 B2 * | 5/2009 | Jung et al. | | 340/572.1 |
| 7,598,866 B2 * | 10/2009 | Hayashi | | 340/572.1 |
| 7,810,726 B2 * | 10/2010 | de la Huerga | | 235/385 |
| 7,872,567 B2 * | 1/2011 | Friedrich | | 340/10.52 |
| 7,999,659 B2 * | 8/2011 | Friedrich | | 340/10.51 |
| 8,005,057 B2 * | 8/2011 | Lim | | 370/338 |
| 8,203,449 B2 * | 6/2012 | Park et al. | | 340/572.1 |
| 8,237,562 B1 * | 8/2012 | Picasso et al. | | 340/572.1 |
| 2004/0124966 A1 * | 7/2004 | Forrest | | 340/5.8 |
| 2006/0054682 A1 * | 3/2006 | de la Huerga | | 235/375 |
| 2006/0208853 A1 * | 9/2006 | Kung et al. | | 340/5.61 |
| 2007/0013488 A1 * | 1/2007 | Hayashi | | 340/10.51 |
| 2007/0103274 A1 * | 5/2007 | Berthold | | 340/10.51 |
| 2007/0132588 A1 * | 6/2007 | Jung et al. | | 340/572.1 |
| 2007/0203835 A1 * | 8/2007 | Cai | | 705/43 |
| 2008/0001724 A1 * | 1/2008 | Soleimani et al. | | 340/10.51 |
| 2008/0085001 A1 | 4/2008 | Charrat et al. | | |
| 2008/0251578 A1 * | 10/2008 | Jansing | | 235/379 |
| 2009/0100428 A1 * | 4/2009 | Willner et al. | | 718/100 |
| 2009/0193500 A1 | 7/2009 | Griffin et al. | | |
| 2009/0259588 A1 * | 10/2009 | Lindsay | | 705/40 |
| 2010/0073147 A1 * | 3/2010 | Guajardo Merchan et al. | | 340/10.51 |
| 2010/0081374 A1 | 4/2010 | Moosavi | | |
| 2010/0085154 A1 * | 4/2010 | Park et al. | | 340/5.85 |
| 2011/0177780 A1 * | 7/2011 | Sato et al. | | 455/41.1 |
| 2011/0212687 A1 * | 9/2011 | Foster | | 455/41.1 |
| 2011/0212707 A1 | 9/2011 | Mahalal | | |
| 2012/0025952 A1 * | 2/2012 | Tsai et al. | | 340/10.1 |
| 2012/0055987 A1 * | 3/2012 | Drummond et al. | | 235/379 |
| 2012/0182123 A1 * | 7/2012 | Butler et al. | | 340/5.65 |

* cited by examiner

*Primary Examiner* — Minh D Dao
(74) *Attorney, Agent, or Firm* — Remarck Law Group PLC

(57) ABSTRACT

A user is authenticated to a mobile computing device using an NFC tag. The NFC tag may be initially associated when an NFC reader of the device senses the NFC tag and wirelessly retrieves a tag identifier from the tag. The tag identifier is stored for subsequent retrieval. The authentication process begins after receiving a valid password and then positioning the device proximate the object such that the NFC reader of the device retrieves the tag identifier from the NFC tag without receiving input at the mobile computing device. In the event that the retrieved tag identifier matches the stored tag identifier, the mobile computing device is unlocked and the user may access the mobile computing device. If the retrieved tag identifier does not match the stored tag identifier, the user is not authenticated and the mobile computing device remains locked.

18 Claims, 6 Drawing Sheets

TWO-FACTOR USER AUTHENTICATION USING NEAR FIELD COMMUNICATION

CROSS-REFERENCE TO RELATED PATENT APPLICATIONS

This application is related to copending U.S. patent application Ser. No. 13/399,569, entitled "USER AUTHENTICATION USING NEAR FIELD COMMUNICATION" filed concurrently herewith on Feb. 17, 2012, the entire disclosure of which is hereby incorporated by reference herein.

BACKGROUND

Most computing devices employ some type of authentication to confirm that a user of the device is who he or she claims to be and to prove that the user is authorized to access the device. Authentication is necessary to prevent an unauthorized user from accessing an unattended computing device. Typically, authentication is based on a username and a password. Other forms of authentication may require a user to draw patterns on a screen or to input a secure code. These authentication processes may not be fully secure because unscrupulous passersby may observe the user performing the authentication and later repeat the process on the user's computing device. In addition, typical authentication may be time consuming, especially since a user of a mobile computing device may want to quickly access the device to make an urgent phone call. Authentication may be more secure using a one-time password that is valid for one login session or transaction. However, one-time passwords are not convenient because the user is required to carry around a token that generates the password, and the password must be entered into the computing device.

SUMMARY

Aspects of the present disclosure relate generally to a user to a mobile computing device using near field communication (NFC). The mobile computing device is provided with NFC capability. An NFC tag is attached to or embedded within an object that is commonly carried or worn by a user. Example objects may include a key chain, a card for storage in a wallet, or a piece of jewelry (e.g., a ring, a necklace or a watch band).

A user may initially access the mobile computing device by entering a valid password. The NFC tag may then be associated with the mobile computing device by positioning the device proximate the NFC tag. An NFC reader of the mobile computing device senses the NFC tag and wirelessly retrieves a tag identifier from the tag. The tag identifier is stored for subsequent retrieval. The tag identifier may be stored in memory of the mobile computing device.

After the tag identifier is associated with the mobile computing device, the user may be subsequently authenticated to the device. The authentication process begins when the user enters a valid password. In a next step, the user positions the device proximate the object such that the NFC reader of the device may retrieve the tag identifier from the NFC tag attached to or embedded in the object. The tag identifier is retrieved from the object without receiving an input at the mobile computing device. The profile stored on the mobile computing device is accessed to determine whether the retrieved tag identifier matches the tag identifier previously stored in the profile. In the event that the two tag identifiers match, the mobile computing device is unlocked and the user may access the mobile computing device. If the retrieved tag identifier does not match the stored tag identifier, the user is not authenticated and the mobile computing device remains locked.

In one aspect, a computing device includes a memory, a processor and a near field communication (NFC) reader. The memory stores a first tag identifier and a first password, each associated with a user. The NFC reader is configured to detect an NFC tag external to the computing device without input being received at the computing device, and retrieve a second tag identifier from the NFC tag. The processor is configured to determine that a second password received as input corresponds to the first password, retrieve the first tag identifier from the memory, determine whether the first tag identifier corresponds to the second tag identifier, and in the event that the first tag identifier corresponds to the second tag identifier, authenticate the user to the computing device.

In another aspect, a system includes a mobile computing device and a near field communication (NFC) tag storing a first tag identifier. The mobile computing device includes a memory for storing a second tag identifier and a first password, a processor and an NFC reader. The NFC reader is configured to retrieve the first tag identifier from the NFC tag without input received at the mobile computing device. The processor is configured to determine that a second password received as input corresponds to the first password, retrieve the second tag identifier from the memory, determine whether the first tag identifier corresponds to the second tag identifier, and in the event that the first tag identifier corresponds to the second tag identifier, authenticate the user to the mobile computing device.

In a further aspect, a computer-implemented method includes associating a first tag identifier of a near field communication (NFC) tag with a mobile computing device. The first tag identifier is stored in memory of the mobile computing device. The first tag identifier is associated with a user. A determination is made that a first password received as input corresponds to a second password stored in the memory of the mobile computing device. The first tag identifier is retrieved from the memory. A second tag identifier is retrieved from the NFC tag without receiving input at the mobile computing device. A determination is made as to whether the first tag identifier corresponds to the second tag identifier. In the event that the first tag identifier corresponds to the second tag identifier, the user is authenticated to the mobile computing device.

DETAILED DESCRIPTION

The aspects, features and advantages of the present disclosure will be appreciated when considered with reference to the following description of example embodiments and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes mobile computing device authentication using near field communication (NFC). A NFC tag is attached to or embedded in an object that is commonly worn or carried by a user. Example objects may include a key chain, a card for storage in a wallet, or a piece of jewelry (e.g., a ring, a necklace or a watch band). The NFC tag may be associated with the mobile computing device by positioning the device proximate the NFC tag such that an NFC reader of the mobile computing device senses the NFC tag and wirelessly retrieves a tag identifier from the tag. The tag identifier is stored for subsequent retrieval. The user may be subsequently authenticated to the device by first entering a valid password and then by positioning the device proximate the object such that the NFC reader retrieves the tag identifier from the NFC tag. The tag identifier is retrieved from the NFC tag without receiving input at the mobile computing device. The mobile computing device determines whether the retrieved tag identifier matches the previously stored tag identifier. In the event that the two tag identifiers match, the mobile computing device is unlocked and the user may access the mobile computing device.

Figure 1:
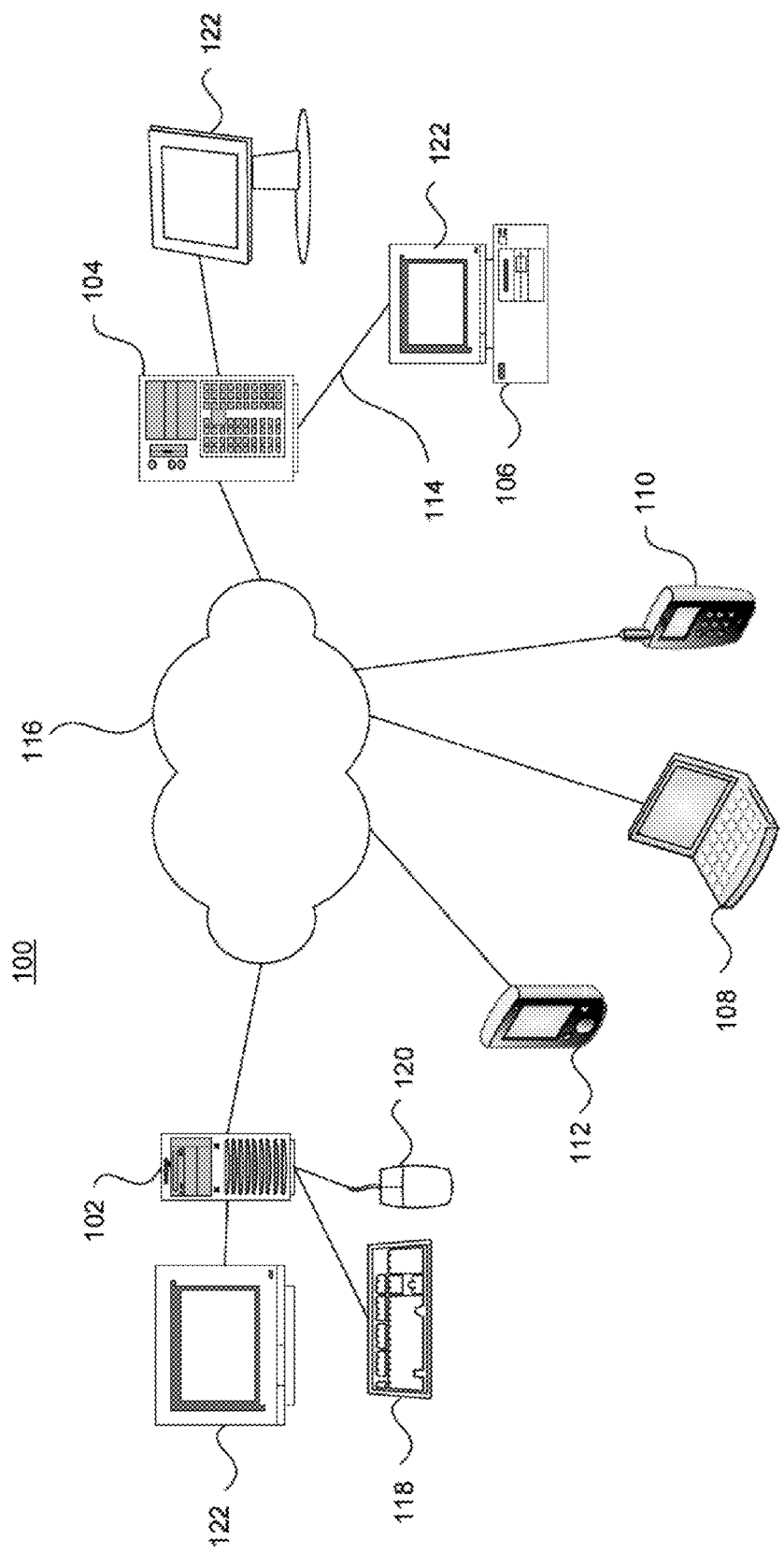
FIG. 1 illustrates a system in accordance with example embodiments.

FIG. 1 presents a schematic diagram of a computer system depicting various computing devices that can be used alone or in a networked configuration in accordance with aspects of the disclosure. For example, this figure illustrates a computer network 100 having a plurality of computers 102, 104, 106, 108 as well as other types of devices such as a mobile phone 110 and a PDA 112. Such devices may be interconnected via a local or direct connection 114 and/or may be coupled via a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

The computer 104 may communicate with one or more of client computers 102, 106 and/or 108, as well as client devices such as mobile computing device 110 and PDA 112. Each computer or other client device may be similarly configured with a processor, memory and instructions, as well as one or more user input devices 118 and a user output device, such as display 122, as discussed with reference to FIG. 2. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

Figure 2:
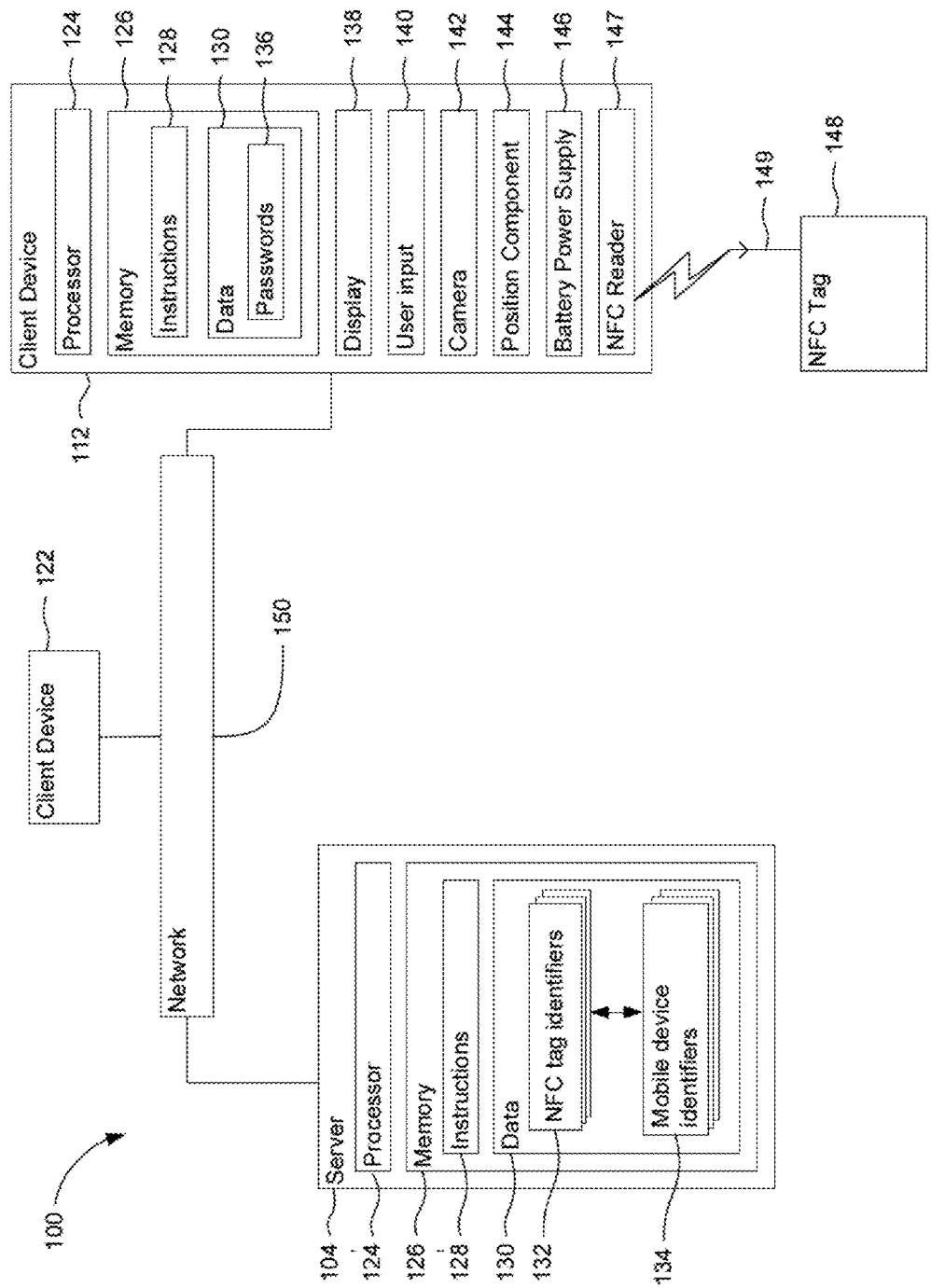
FIG. 2 illustrates aspects of the system of FIG. 1.

The computer 104 and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network 116, including any intervening nodes, may be facilitated by any device capable of transmitting data to and from other computers, such as modems (e.g., dial-up or cable), network interfaces and wireless interfaces. Although certain advantages are obtained when information is transmitted or received as noted above, other aspects are not limited to any particular manner of transmission of information. For example, in some aspects, the information may be sent via a medium such as a disk, tape, CD-ROM, or directly between two computer systems via a dial-up modem.

Moreover, computers and user devices in accordance with the systems and methods described herein may comprise any device capable of processing instructions and transmitting data to and from other computers, including network computers lacking local storage capability, PDAs with modems such as PDA 112 and Internet-capable wireless phones such as mobile phone 110.

As shown in FIG. 2, each computer, such as server 104 and client devices 112, 122, contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor 124. The memory/storage 126 may be of any type or any device capable of storing information accessible by the processor 124, including a computer-readable medium, or other medium that stores data that may be read with the aid of an electronic device, such as a hard-drive, memory card, ROM, RAM, CD-ROM or other optical disks, flash memories, write-capable or read-only memories. In that regard, memory/storage 126 may include short term or temporary storage as well as long term or persistent storage. Systems and methods may include different combinations of the foregoing, whereby different portions of the instructions 128 and data 130 are stored on different types of media.

The processor 124 may comprise any number of well known processors, such as a CPU. Alternatively, the processor may be a dedicated controller for executing operations, such as an ASIC. Although FIG. 2 functionally illustrates the processor 124 and memory 126 as being within the same block, the processor 124 and memory 126 may actually comprise multiple processors and memories that may or may not be stored within the same physical housing. For example, the processor 124 may comprise a collection of processors which may or may not operate in parallel, and memory 126 may be a hard drive or other storage media located in a server farm of a data center. Some or all of the instructions 128 and data 130 may be stored in a location physically remote from, yet still accessible by, the processor 124. For example, data 130 may be distributed and stored across multiple memories 126 such as hard drives or the like. Accordingly, references to a processor, a computer or a memory will be understood to include references to a collection of processors or computers or memories that may or may not operate in parallel.

The instructions 128 may include any set of instructions to be executed directly (such as machine code) or indirectly (such as scripts) by the processor(s). For example, the instructions may be stored as computer code on the computer-readable medium. In that regard, the terms "instructions," "steps" and "programs" may be used interchangeably herein. The instructions 128 may be stored in any computer language or format, such as in object code or modules of source code. The functions, methods and routines of the instructions 128 are described in detail below.

Data 130 may be retrieved, stored or modified by processor 124 in accordance with the instructions 128. The data 130 may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data 130 may include any information sufficient to identify the relevant information, such as descriptive text, proprietary codes, pointers, references to data stored in other memories (including other network locations) or information which is used by a function to calculate the relevant data.

The data 130 stored on server 104 may include a database of NFC tag identifiers 132 that identify NFC tags associated with particular mobile devices as identified by corresponding mobile device identifiers 134, as described in detail below. The data 130 stored on client device 112 may include one or more passwords that may be used to unlock the client device 112 when a user inputs data that matches a corresponding password.

Although the client devices 112, 122 may each comprise a full-sized personal computer, they may alternatively comprise mobile computing devices capable of wirelessly exchanging data. By way of example only, client device 112 may be a wireless-enabled PDA or a cellular phone capable of obtaining information via the Internet. The client device 112 may have all of the components normally used in connection with a mobile computing device such as processor 124, memory 126, instructions 128 and data 130, as described above. The client device 112 may include an electronic display 138 (e.g., a monitor having a screen, a touch-screen, a projector, a television, a computer printer or any other electrical device that is operable to display information), and user input 140 (e.g., a mouse, keyboard, touch-screen or microphone). The client device 110 may also include a camera 142, geographical position component 144, accelerometer, speakers, a network interface device, a battery power supply 146 or other power source, an contactless element such as a near field communication (NFC) reader 147, and all of the components used for connecting these elements to one another.

The geographical position component 144 may be used to determine the geographic location and orientation of the client device 112. For example, the client device 112 may include a GPS receiver to determine the device's latitude, longitude and altitude. Thus, as the client device 112 changes locations, for example by being physically moved, the GPS receiver may determine a new current location. The position component 144 may also comprise software for determining the position of the device 112 based on other signals received at the client device 112, such as signals received at a cellular phone's antennas from one or more cellular phone towers if the client device 112 is a cellular phone.

The NFC reader 147 is typically implemented in the form of a semiconductor integrated circuit (or other data storage element) with an associated wireless transfer (e.g., data transfer) element such as an antenna. Data or control instructions transmitted via a cellular network may be applied to the NFC reader 147 by a contactless element interface (not shown). The contactless element interface functions to permit the exchange of data and/or control instructions between mobile device circuitry (and hence the cellular network) and the NFC reader 147.

The NFC reader 147 is capable of transferring and receiving data using a NFC capability (or a NFC medium) typically in accordance with a standardized protocol or data transfer mechanism (e.g., ISO 14443/NFC). NFC capability is a short-range communications capability, and may comprise RFID, Bluetooth™, infra-red, or other data transfer capability that can be used to exchange data between the client device 112 and the network 150. Thus, the client device 112 is capable of communicating and transferring data and/or control instructions via both cellular network and NFC capability.

The NFC reader 147 may be configured to communicate with NFC tag 148 via an antenna 149 provided on the NFC tag 148 when the NFC tag 148 is positioned proximate the client device 112. The NFC tag 148 may be a passive device that receives power from an electromagnetic field provided by the client device 112. The NFC tag 148 may also be a static device such that a value of an identifier of the NFC tag 148 does not dynamically change with subsequent interactions with the NFC reader 147. In one example, NFC communication is enabled between the NFC tag 148 and the NFC reader 147 when the NFC reader 147 is positioned within approximately four centimeters of the NFC tag 148. The communication between the NFC reader 147 and the NFC tag 148 may be enabled without receiving any input at the client device 112. The NFC tag 148 may be configured to be attached to or embedded in an object. In one embodiment, the object may be something that is commonly carried by a user such as a keychain, a piece of jewelry (e.g., watch, ring, necklace), or a card that can be carried in a wallet or purse. The NFC tag 148 may be included in a sticker that may be adhered to the object.

In addition to the operations described below and illustrated in the figures, various operations in accordance with aspects of the disclosure will now be described. It should also be understood that the following operations do not have to be performed in the precise order described below. Rather, various steps can be handled in a different order or simultaneously.

Figure 3:
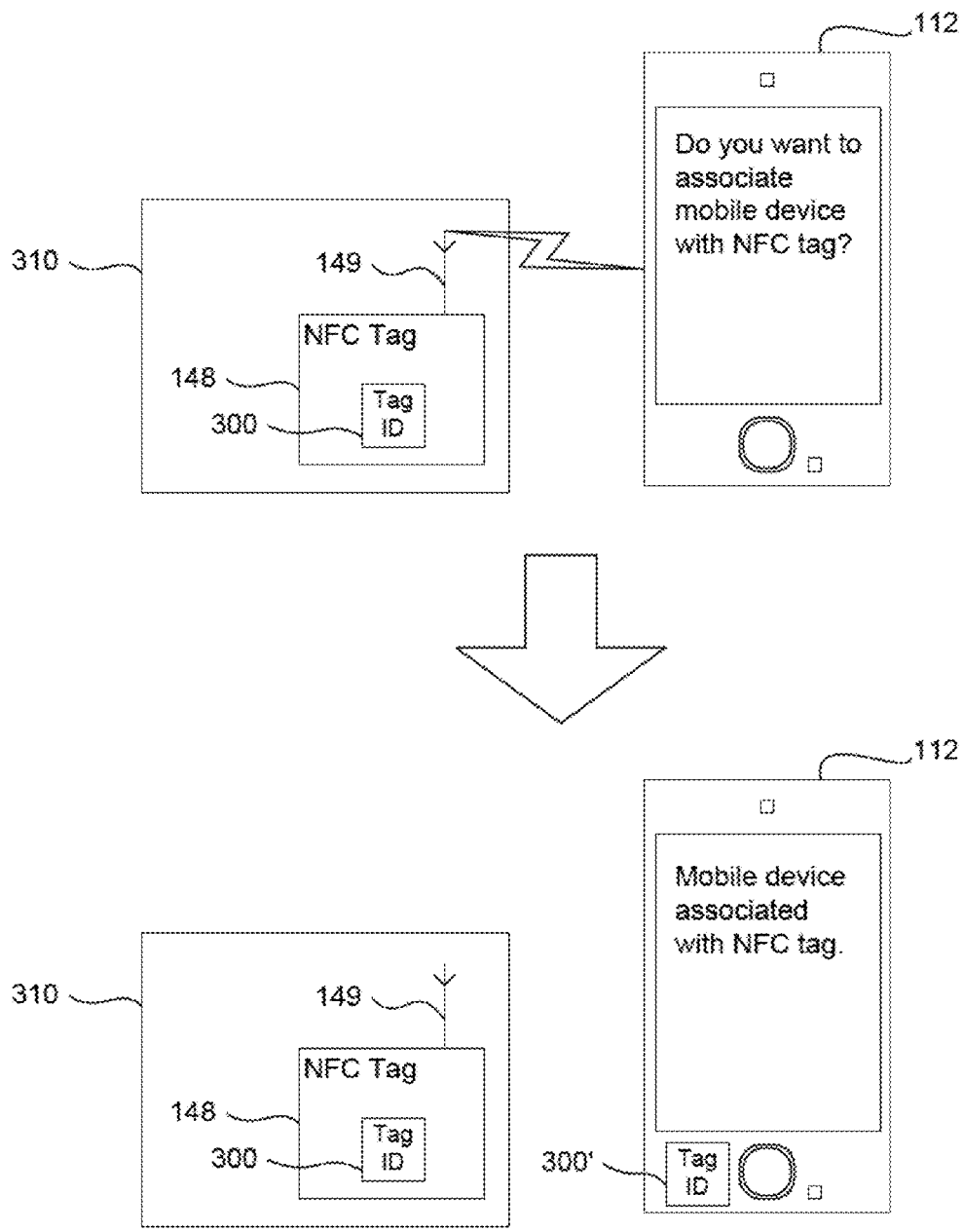
FIG. 3 is a pictorial diagram in accordance with example embodiments.

FIG. 3 illustrates a pictorial diagram of associating a mobile computing device with an NFC tag, in accordance with example embodiments. The mobile computing device may be the client device 112 as illustrated in FIGS. 1 and 2. The NFC tag 148 may communicate with the client device 112 via the antenna 149 as described above. The NFC tag 148 includes a tag identifier 300 that uniquely identifies the NFC tag 148 such that the NFC tag 148 may be distinguished from other NFC tags.

The NFC tag 148 may be attached to or embedded within an object 310 that is commonly carried or worn by a user. In one example, the object 310 is a card that may be carried in a user's wallet or purse, and the NFC tag 148 may be adhered to the card using, for example, a sticker that includes the NFC tag 148. The NFC tag 148 may also be embedded in the plastic from which the card is made. In another example, the object 310 is a piece of jewelry such as a necklace. The NFC tag 148 may be embedded in or attached to a pendant of the necklace. The NFC tag 148 may also be attached to a watch or a ring. For example, the NFC tag 148 may be attached to either side of the ring or a wrist band of the watch. However, some materials such as metal may impede communication between the NFC tag 148 and the NFC reader of the client device 112. Accordingly, a wider range of near field communication may be achieved by ensuring that the antenna 149 is not embedded or otherwise covered with a material that may interfere with communication between the NFC tag 148 and the client device 112. Thus, it is preferable that the NFC tag 148 be placed on an outer surface of a metal bracelet, watch band or finger ring.

The client device 112 is associated with the NFC tag 148 of the object 310 by first entering a valid password and then positioning the client device 112 proximate the object 310. In one example, the NFC tag 148 is a passive device such that power is received from the NFC reader when the device 112 is positioned within near field communication range of the NFC tag 148. For the NFC reader of the client device 112 to sense the NFC tag 148, the client device 112 should be positioned such that the NFC reader is within approximately four centimeters of the NFC tag 148.

The user of the client device 112 may initiate the association process by activating a program on the client device 112. The client device 112 may display a prompt requesting user input to initiate the association of the client device 112 with the NFC tag 148 of the object 310. In response to user confirmation of the association process, the NFC reader may wirelessly read the tag identifier 300 from the NFC tag 148 and store the retrieved tag identifier 300' in the client device 148.

Figure 4:
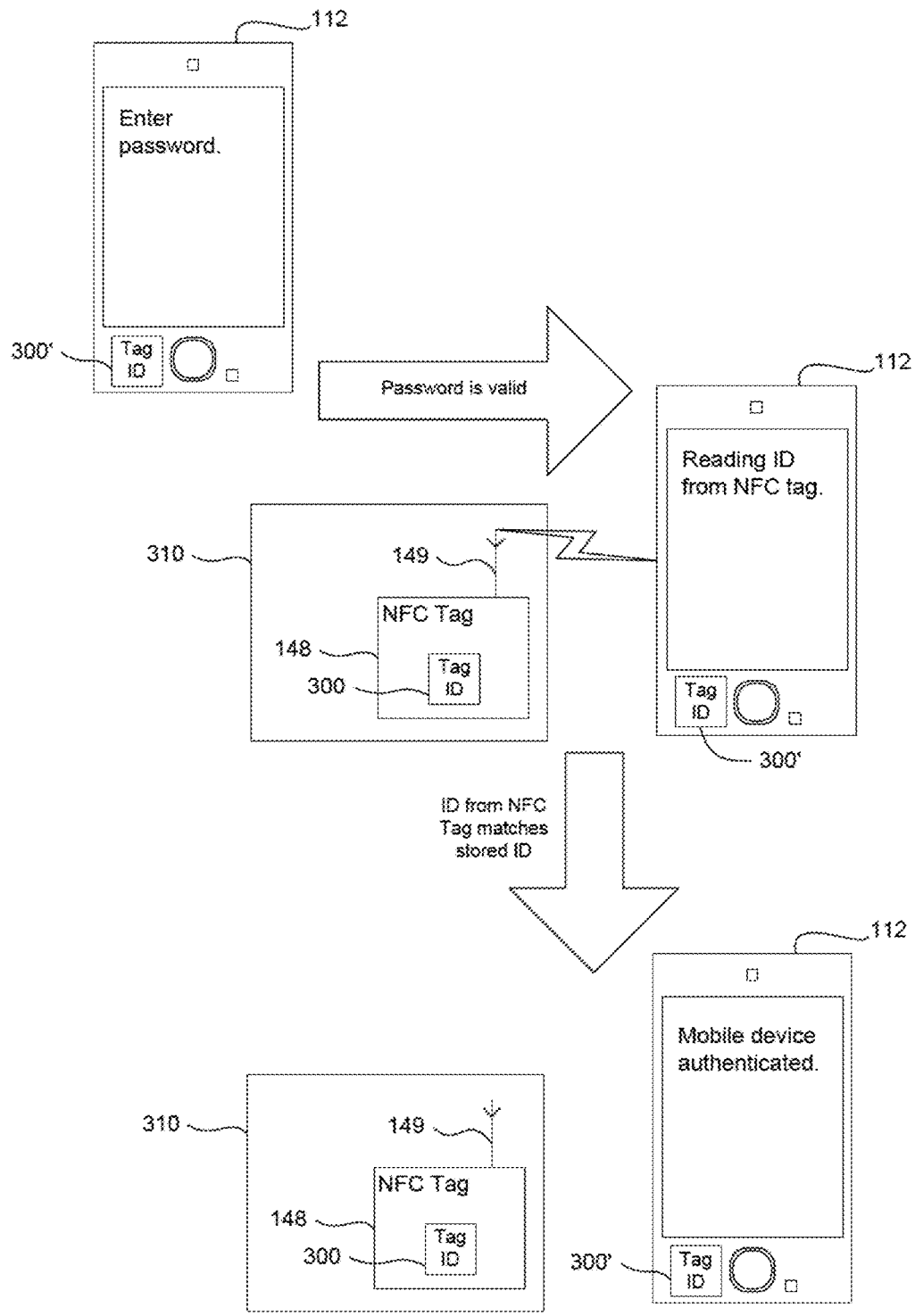
FIG. 4 is another pictorial diagram in accordance with example embodiments.

FIG. 4 illustrates a pictorial diagram of authenticating a user to a mobile computing device using an NFC tag, in accordance with example embodiments. The authentication process begins when a user enters a valid password to activate the NFC capability of the client device 112. The client device 112 is then positioned within near field communication range of an NFC tag, such as NFC tag 148. The user may hold the client device 112 up to her pendant, watch, ring, purse or wallet, depending on where the NFC tag 148 is located.

In one example, the NFC tag 148 is powered by the electromagnetic field emitted by the NFC reader of the client device 112 and received at the NFC tag 148 via the antenna 149. Communication may be established between the NFC reader and the NFC tag 148 without receiving any user input at the client device 112. The tag identifier 300 of the NFC tag 148 is read by the NFC reader of the client device 112. The client device 112 may indicate to the user that authentication is being attempted by providing an indicator on its display. In some embodiments, the tag identifier 300 is static such that a value of the tag identifier 300 does not dynamically change after subsequent interactions between the NFC reader and the NFC tag 148.

The client device 112 determines whether the tag identifier 300' that was stored during the previous association process matches the tag identifier 300 retrieved from the NFC tag 148. In the event that the two tag identifiers 300, 300' match, the user is authenticated to the client device 112. The client device 112 is then fully unlocked such that the user may access and interact with the device 112. If the tag identifier 300 retrieved from the NFC tag 148 does not match or correspond to the tag identifier 300' stored in the client device 112, the client device 112 remains locked and the user is prevented from interacting with the device 112.

Figure 5:
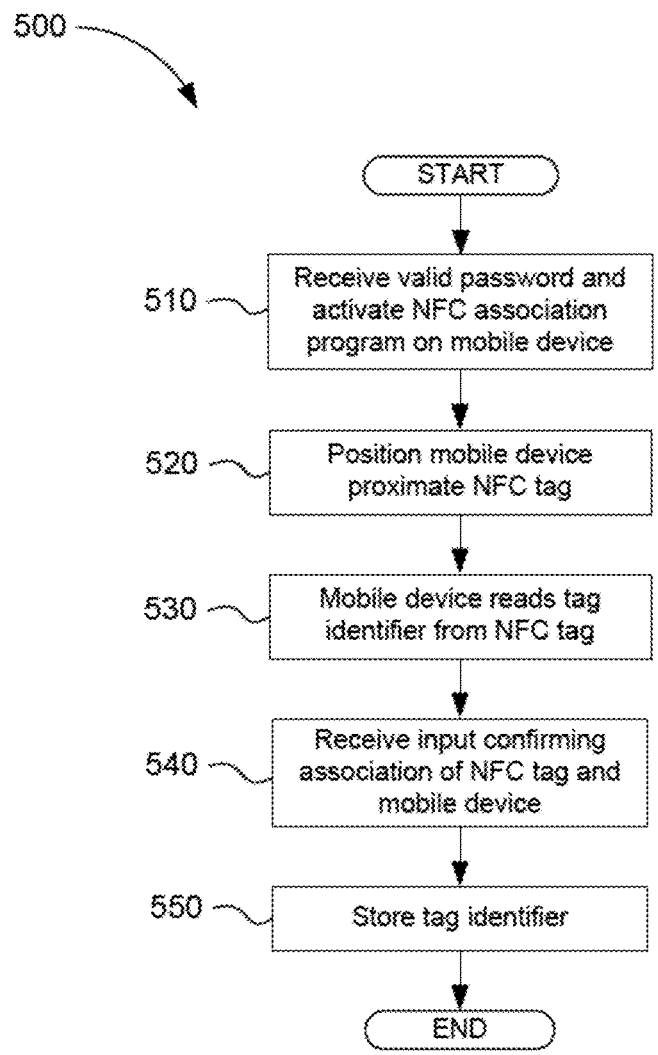
FIG. 5 is a flow diagram in accordance with example embodiments.

FIG. 5 illustrates a process 500 of associating a mobile computing device with an NFC tag, in accordance with example embodiments. The process 500 begins when a user enters a valid password to activate an NFC association program on the mobile computing device (block 510). The NFC association program attempts to associate the mobile computing device with an NFC tag within near field communication range of the device. Accordingly, activation of the NFC association program activates the NFC reader of the mobile computing device, and the NFC reader searches for any NFC tags in near field communication range.

The mobile computing device is positioned proximate an NFC tag that may be attached to or embedded in an object (block 520). The object is something that the user would commonly wear or carry. Example objects include a card or a piece of jewelry such as a watch, necklace or a ring. The NFC tag is attached to the object such that communication between the NFC tag and the NFC reader of the mobile computing device is not impeded or otherwise compromised. Accordingly, an antenna of the NFC tag may be provided at or near an outer surface of the object. The mobile computing device is positioned near the object such that near field communication is enabled between the NFC reader and the NFC tag. For example, the mobile computing device may be placed near the object such that the NFC reader is within approximately four centimeters of the NFC tag.

The NFC reader of the mobile computing device reads a tag identifier associated with the NFC tag (block 530). Each NFC tag is assigned a unique tag identifier that is used to distinguish different NFC tags. The NFC reader is able to read the tag identifiers of any NFC tags within near field communication range of the NFC reader. In some embodiments, the detection of the NFC tag may cause the mobile computing device to prompt the user whether to continue with the association process.

In response to the prompt, the mobile computing device may receive confirmation from the user that the mobile computing device is to be associated with the NFC tag (block 540). In the event that the NFC reader detects more than one NFC tag, the prompt may indicate that the user should move all but one of the NFC tags out of near field communication range so that the association process can continue with the NFC tag that is within range. The user confirmation to proceed with the association of the mobile computing device to the NFC tag prevents the device from being inadvertently associated with a nearby NFC tag without the user's knowledge.

The tag identifier is stored in memory of the mobile computing device (block 550). The stored tag identifier may be subsequently retrieved during a process of authenticating a user to the mobile computing device. In some embodiments, the tag identifier is static such that a value of the tag identifier does not change after subsequent interactions with an NFC reader. In some embodiments, the tag identifier may also be stored on a server connected to a network that is also accessible by the mobile computing device. The remote storage of the tag identifier promotes enterprise management of the mobile computing device. Processing then terminates.

Figure 6:
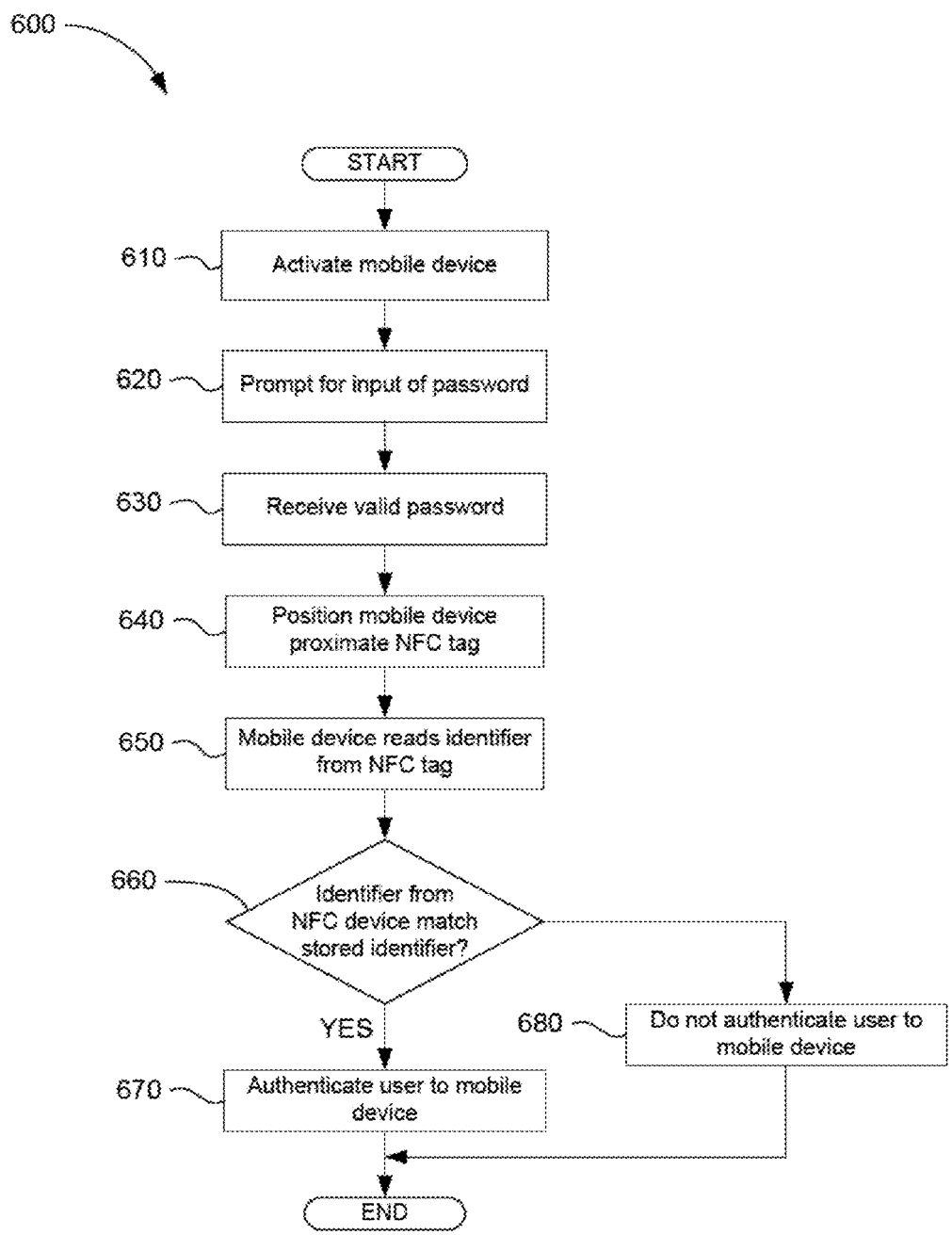
FIG. 6 is another flow diagram in accordance with example embodiments.

FIG. 6 illustrates a process 600 of authenticating a user to a mobile computing device using an NFC tag, in accordance with example embodiments. The process 600 begins when a user activates the mobile computing device (block 610). The user may activate the mobile computing device by powering up the device or by attempting to unlock the device.

The mobile computing device then prompts a user to input a password (block 620). The password provides a first security stage that must be overcome by receiving a valid password (block 630); otherwise the authentication process 600 terminates.

The mobile computing device is positioned proximate an object that includes an NFC tag embedded therein or attached thereto (block 640). The user may move the mobile computing device proximate the object, the user may move the object proximate the mobile computing device, or the user may move the object and the mobile computing device toward each other. The mobile computing device should be positioned close enough to the object such that the device's NFC reader is within near field communication range of an antenna of the object's NFC tag. In most cases, the NFC range is approximately four centimeters. When the NFC reader is within NFC range of the NFC tag, the NFC tag is powered by an electromagnetic field transmitted by the NFC reader. The mobile computing device then reads the tag identifier from the NFC tag (block 650). It is not necessary for the user to provide input to the mobile computing device in order for the mobile computing device to read the tag identifier from the NFC tag. The mobile computing device may provide an indication on a display that informs the user that the NFC tag has been sensed nearby and that authentication is being attempted.

A determination is made as to whether the tag identifier retrieved from the NFC tag matches or otherwise corresponds to the tag identifier that was stored during the association process 500 (block 660). In the event that the retrieved tag identifier corresponds to the stored tag identifier, processing continues to block 670 where the user is authenticated to the mobile computing device. In the event that the retrieved tag identifier does not match or otherwise correspond to the stored tag identifier, processing proceeds to block 680 where the mobile computing device remains locked because the user cannot be authenticated.

As described above, a mobile computing device may be unlocked by entering a valid password and then positioning the device proximate an NFC tag that may be embedded in or attached to an object. An NFC reader of the mobile computing device senses the NFC tag and retrieves an NFC identifier without receiving input at the mobile computing device. In the event that the retrieved NFC identifier matches a previously retrieved and stored NFC identifier, a user is authenticated to the mobile computing device and the device is unlocked such that the user may access the device. If the tag identifiers do not match, the device remains locked.

As these and other variations and combinations of the features discussed above can be utilized without departing from the invention as defined by the claims, the foregoing description of embodiments should be taken by way of illustration rather than by way of limitation of the implementations as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computing device comprising:
a memory for storing a first tag identifier and a first password, wherein the first tag identifier and the first password are associated with a user;
a near field communication (NFC) reader configured to:
detect an NFC tag external to the computing device, wherein the NFC tag is detected without input being received at the computing device, and
retrieve a second tag identifier from the NFC tag; and
a processor configured to:
determine that a second password received as input corresponds to the first password,
retrieve the first tag identifier from the memory,
determine whether the first tag identifier corresponds to the second tag identifier, and
in the event that the first tag identifier corresponds to the second tag identifier, authenticate the user to the computing device.

2. The computing device of claim 1, wherein the NFC reader is further configured to retrieve the first tag identifier from the NFC tag for storage in the memory of the computing device before the second tag identifier is retrieved from the NFC tag.

3. The computing device of claim 1, wherein, in the event that the first tag identifier does not correspond to the second tag identifier, the processor is configured to prevent user access to the computing device.

4. The computing device of claim 1, wherein the NFC tag is associated with an object that is associated with the user.

5. The computing device of claim 4, wherein the object is a card.

6. The computing device of claim 4, wherein the object is a piece of jewelry.

7. A system comprising:
a near field communication (NFC) tag storing a first tag identifier; and
a mobile computing device comprising:
a memory for storing a second tag identifier and a first password;
an NFC reader configured to retrieve the first tag identifier from the NFC tag, wherein the NFC reader retrieves the first tag identifier without input received at the mobile computing device; and
a processor configured to:
determine that a second password received as input corresponds to the first password,
retrieve the second tag identifier from the memory,
determine whether the first tag identifier corresponds to the second tag identifier, and
in the event that the first tag identifier corresponds to the second tag identifier, authenticate the user to the mobile computing device.

8. The system of claim 7, wherein the NFC reader is further configured to retrieve the second tag identifier from the NFC tag for storage in the memory of the mobile computing device before the first tag identifier is retrieved from the NFC tag.

9. The computing device of claim 7, wherein the NFC tag is associated with an object that is associated with the user.

10. The computing device of claim 9, wherein the object is a card.

11. The computing device of claim 9, wherein the object is a piece of jewelry.

12. The system of claim 7, wherein, in the event that the first tag identifier does not correspond to the second tag identifier, the processor is configured to prevent the user from accessing the computing device.

13. A computer-implemented method comprising:
associating a first tag identifier of a near field communication (NFC) tag with a mobile computing device, wherein the first tag identifier is stored in memory of the mobile computing device, the first tag identifier being associated with a user;
determining that a first password received as input corresponds to a second password stored in the memory of the mobile computing device;
retrieving the first tag identifier from the memory;
retrieving a second tag identifier from the NFC tag, wherein the second tag identifier is retrieved from the NFC tag without receiving input at the mobile computing device;
determining whether the first tag identifier corresponds to the second tag identifier; and
in the event that the first tag identifier corresponds to the second tag identifier, authenticating the user to the mobile computing device.

14. The method of claim 13, further comprising retrieving the first tag identifier from the NFC tag for storage in the memory of the mobile computing device before retrieving the second identifier from the NFC tag.

15. The method of claim 13, wherein, in the event that the first identifier does not correspond to the second identifier, preventing the user from accessing the computing device.

16. The method of claim 13, wherein the NFC tag is associated with an object that is associated with the user.

17. The method of claim 16, wherein the object is a card.

18. The method of claim 16, wherein the object is a piece of jewelry.

\* \* \* \* \*